United States Patent [19]
Bredin

[11] Patent Number: 5,809,260
[45] Date of Patent: Sep. 15, 1998

[54] BURST MODE DATA TRANSMISSION RETRY OF PREVIOUSLY ABORTED BLOCK TRANSFER OF DATA

[75] Inventor: Francis Bredin, Maisons-Alfort, France

[73] Assignee: International Business Machines Corp., Armonk, N.Y.

[21] Appl. No.: 716,011

[22] Filed: Sep. 19, 1996

[30] Foreign Application Priority Data

Sep. 22, 1995 [EP] European Pat. Off. .............. 95480146

[51] Int. Cl.[6] .............. G06F 13/32; G06F 13/28; G06F 13/42
[52] U.S. Cl. .............. 395/308; 395/310; 395/855; 395/181; 395/182.15; 395/183.19; 395/185.09
[58] Field of Search ...................... 395/308, 310, 395/285, 281, 855, 181, 182.15, 183.19, 185.09; 370/402

[56] References Cited

U.S. PATENT DOCUMENTS

| 5,303,354 | 4/1994 | Higuchi et al. | 395/800 |
| 5,499,346 | 3/1996 | Amini et al. | 395/308 |
| 5,509,127 | 4/1996 | Datwyler et al. | 395/308 |
| 5,655,076 | 8/1997 | Jimura et al. | 395/185.09 |

Primary Examiner—Alyssa H. Bowler
Assistant Examiner—Jeffrey Allen Rossi
Attorney, Agent, or Firm—Martin J. McKinley

[57] ABSTRACT

Blocks of data are transferred in burst mode from a first device attached to a first bus, to a second device attached to a second bus having time multiplexed address/data lines. A bridge circuit includes an address register, which is coupled to the first bus, a circuit for incrementing the address register, and an output register coupled to the address/data lines of the second bus. In an aborted burst mode transfer of a block of data from one device to the other in which a "last" data byte in the block was successfully transferred, but a "next" byte of data was not successfully transferred, the system provides for an efficient retry of the transfer of the aborted data block. This efficient retry is accomplished in part by swapping the information in the address register of the bridge circuit with the information in its output register, such that the output register contains the address of the "next" data byte. After the address of the "next" data byte is placed on the second bus, a second swap occurs, such that the "next" data byte itself is moved back into the output register.

2 Claims, 6 Drawing Sheets

BURST MODE DATA TRANSMISSION RETRY OF PREVIOUSLY ABORTED BLOCK TRANSFER OF DATA

BACKGROUND OF THE INVENTION

Applicants claim the foreign priority benefits under 35 U.S.C. 119 of European Application No. 95480146.0 filed Sep. 22, 1995. This European Application is incorporated by reference into this Application.

This invention pertains to computers and other data processing apparatus and, more particularly, to a data processing apparatus having a means for transferring blocks of data in burst mode and further including a means to transmit a previously aborted block transfer of data.

Computer systems typically include more than one bus, each bus in the system having devices attached thereto which communicate locally with each other over the bus. Examples of the different types of buses present in typical computer systems are a system bus to which a host central processing unit is attached and one or more peripheral buses. System-wide communication over different buses is required, however, if a device attached to one bus needs to read or write information to or from a device on another bus. To permit system-wide communication between devices on different buses, bus-to-bus bridges (interfaces) are provided to match the communications protocol of one bus with that of another.

Different bus-to-bus bridges are described in the following documents from IBM Corporation: Technical Disclosure Bulletin Vol.38 No.5, May 95, pp. 401–402 and EP 0 629 956 A2. These applications describe mechanisms which permit system-wide communication of devices attached to different buses in the system.

Each bus-to-bus bridge in a multi-bus computer system is used to connect two buses in the system. Various types of buses are available to construct a given computer system. One such bus which is becoming widely accepted is the PCI (Peripheral Component Interconnect) bus, which is capable of performing significant data transfer in a relatively short period of time (up to 120 Megabytes of data per second). The PCI bus achieves this high level of performance, in part, because it may be directly linked to other high speed buses, such as system buses to which a CPU may be connected and, thus, may provide for rapid transfer of data between devices attached to the PCI bus and devices attached to the system bus. In fact, the operation of several high integration devices, such as certain graphics package controllers, require a direct link to a system bus through a high performance bus such as the PCI bus. In addition, the PCI bus architecture does not require any "glue logic" to operate peripheral devices connected to it. Glue logic for other buses typically consists of miscellaneous hardware components such as decoders, buffers or latches that are installed intermediate the peripheral devices and the bus.

The primary PCI bus operates on a synchronous clock signal of 33 MHZ, and the strings of data transmitted over the PCI bus are 32 bits or 64 bits long. A 32-bit data string on the PCI bus is called a double word (DWORD), which is divided into 4 bytes each comprised of 8 bits of data. The address and data information carried by the PCI bus are multiplexed onto one bus. Multiplexing eliminates the need for separate address and data lines, which in turn, reduces the amount of signals required in a PCI bus environment as opposed to other bus architectures. The number of signals required in PCI bus architecture is between 45–47 while non-multiplexed buses typically require twice this number. Accordingly, because the number of signals are reduced, the number of connection pins required to support a device linked to the PCI bus is also reduced by a corresponding number. Thus, PCI architecture is particularly adapted for highly integrated desktop computer systems.

A more detailed description of the structure and operation of PCI bus architecture is provided in "Peripheral Component Interconnect (PCI) Revision 2.0 Specification", published Apr. 30, 1993 by the PCI Special Interest Group.

The basic bus transfer mechanism on PCI is a single transfer, but the performance is given by a burst transfer. A sequential burst transfer is a data transfer in which one address is provided during the address phase and several data phases occur thereafter. During the first data phase, the data is transferred into or out of the address provided in the address phase. During the subsequent data phases, the data transfers take place at the respective addresses that sequentially follow the address provided in the address phase (hereinafter sequential burst transfers shall be referred to simply as burst transfers or burst data strings).

The PCI burst protocol allows for the bursting of an unlimited number of data strings starting on any address boundary (assuming, of course, that PCI arbitration guidelines do not force the device initiating the burst to relinquish the bus). In contrast, the system bus burst protocol restricts the starting address for a burst transfer to certain address boundaries and allows only a certain number of data phases in a single burst transfer. Accordingly, the system bus architecture only permits a burst of four doublewords (DWORD's) or 16 bytes of data.

These restrictions in the system bus architecture, as well as others set forth below, require that the host bridge connecting a system bus and a PCI bus translate data transfers between the two different buses. The host bridge connecting a PCI bus to a system bus, however, must not only translate data between the two different architectures, but must perform this translation as efficiently as possible.

Interfacing the PCI bus to other buses such as a host system bus in a computer system is problematic, however, if the communications protocols between the PCI bus and the host system bus are different. For example, although the PCI bus specification provides for PCI bus communications recovery errors to be detected, no means exist for either reporting or recovering from these errors.

In typical computer systems an unsuccessful data transfer is detected and reported over the host system bus for management by the CPU. The CPU begins an error recovery procedure to retry the failed access.

EP 0 498 472 A2 from Hitachi discloses a microprocessor starting and commanding a retry data transfer on an ensuing bus cycle of a data communication. The number of times of retry of the same data transfer is counted, and if it exceeds a predetermined limit, further retry is inhibited.

In IBM Technical Disclosure Bulletin Vol.36, No. 6A, June 1993, pp. 335–336, an error on a channel is reported separately to the CPU and to a process controller. The untransferred data is put into a memory called a trace array, and is later read by the process controller which begins its part of the recovery procedure. The channel identifies to the CPU the stage of the procedure it is in, and the CPU uses this information to decide whether a simple retry is possible or whether the operation must be restarted from the beginning.

While the above prior art provides many advantages in terms of error recovery in the described peripherals subsystems, it does not provide for fast I/O subsystems (such as multimedia) with high performance and low latency component-level local bus (such as PCI).

Thus a need exists for an error recovery procedure which does not impact the global performance of data transfer and fits the need of increasing system capacity performance and compatibility of future attachment technologies.

Therefore, it is an object of the present invention to provide a fast error recovery method.

It is another object of the present invention to provide an error recovery method with reduce environmental impact.

It is still another object of the present invention to provide an error recovery method with no interrupt routine over the CPU.

Yet, it is an object of the present invention to provide a data transfer system and method based on burst transfer for peripheral devices that do not accept multiple data phases.

SUMMARY OF THE INVENTION

The present invention provides a host bridge for interfacing a PCI bus to a system bus in a multiple bus computer system, which detects the occurrence of recovery errors during PCI bus cycles, and generates a retry procedure.

The PCI host bridge resides intermediate the PCI bus and the system bus. Upon detection of the initialization of a PCI bus cycle, the PCI host bridge monitors the ensuing read or write transaction occurring over the PCI bus, and stores information relating to the cycle in host bridge registers. The stored information includes control and address information, arbitration identification of the device initiating the PCI bus cycle, and the data being transmitted across the PCI bus. If, during the PCI cycle, an error is detected by the PCI host bridge, the CPU is not notified of the event, and no interrupt routine is generated. It is therefore an advantage of the invention to provide a system and method which reduces the impact of the error recovery procedure over the system cycle. The logic required to implement the error detection and recovery mechanism, is an algorithm implemented on the PCI host bridge, comprising the steps of (I) detecting a recovery error occurring during a transaction on a data stored into a first register of the host bridge, (ii) processing the error into the host bridge, and (iii) retrying the transaction over the peripheral bus.

The detecting step may be composed of the detection of a first signal indicating that the current transaction must stop followed by the generation of a signal indicating whether a retry operation is requested for the same data.

In another embodiment, the processing step may be a double swap. The failed data contained into an output register of the host bridge is send to another register while the address of this data is send to the output register. Next the address is send onto the peripheral bus, and finally the failed data is send back to the output register while the address returns to its first register.

In yet another embodiment the output register may be composed of a multiplexer that outputs on the peripheral bus either the address or the data according to the phase transaction. The peripheral bus may conform to Peripheral Component Interconnect (PCI) architecture.

A detailed explanation of the invention can be found in the accompanying description and drawings.

BRIEF DESCRIPTION OF THE DRAWINGS

FIG. 1, which is composed of individual FIGS. 1A, 1B and 1C, is a block diagram of a data processing system with multiple buses.

DESCRIPTION of the ILLUSTRATIVE EMBODIMENTS

Figures 1, 1C:
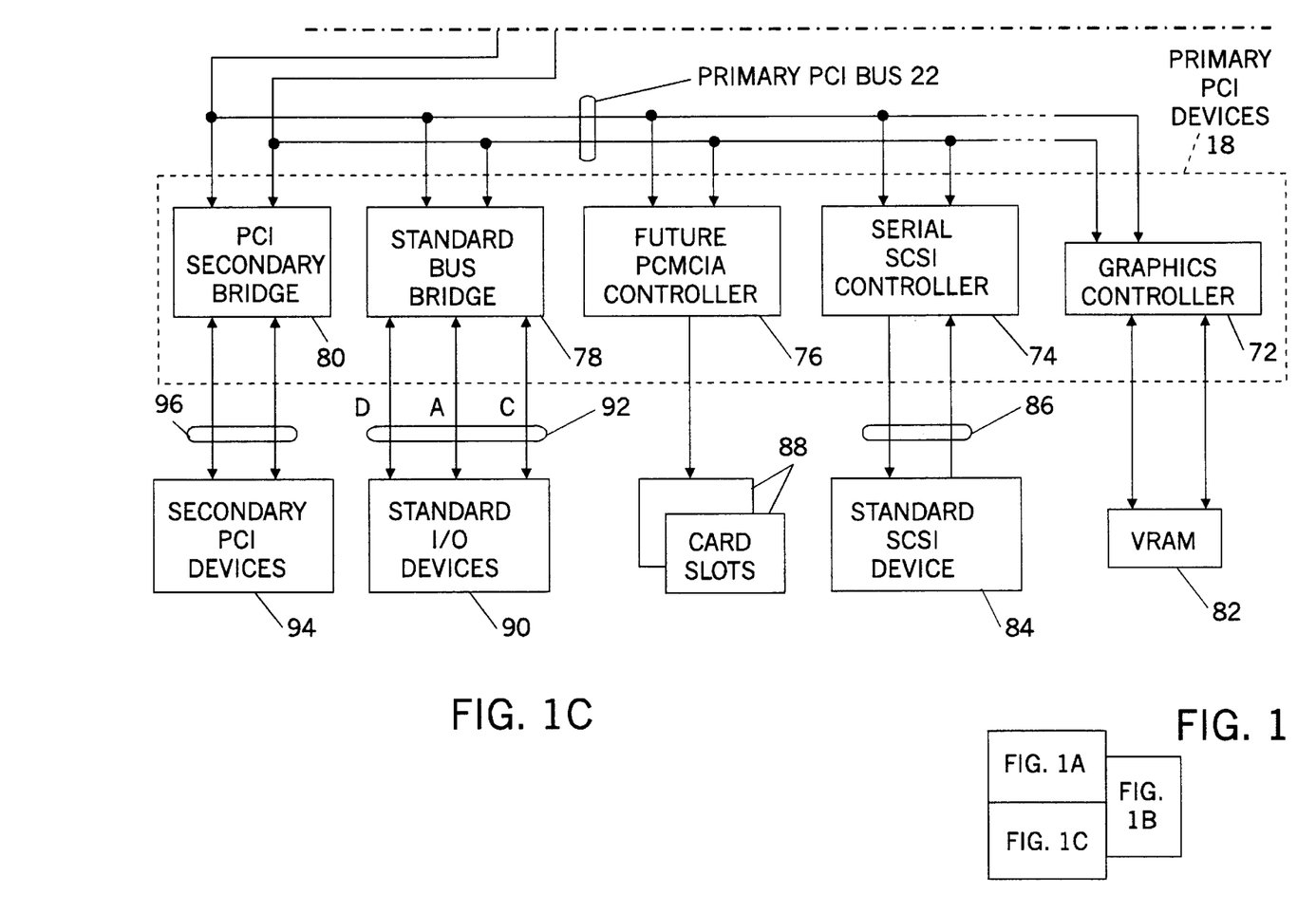
Figure 1A:
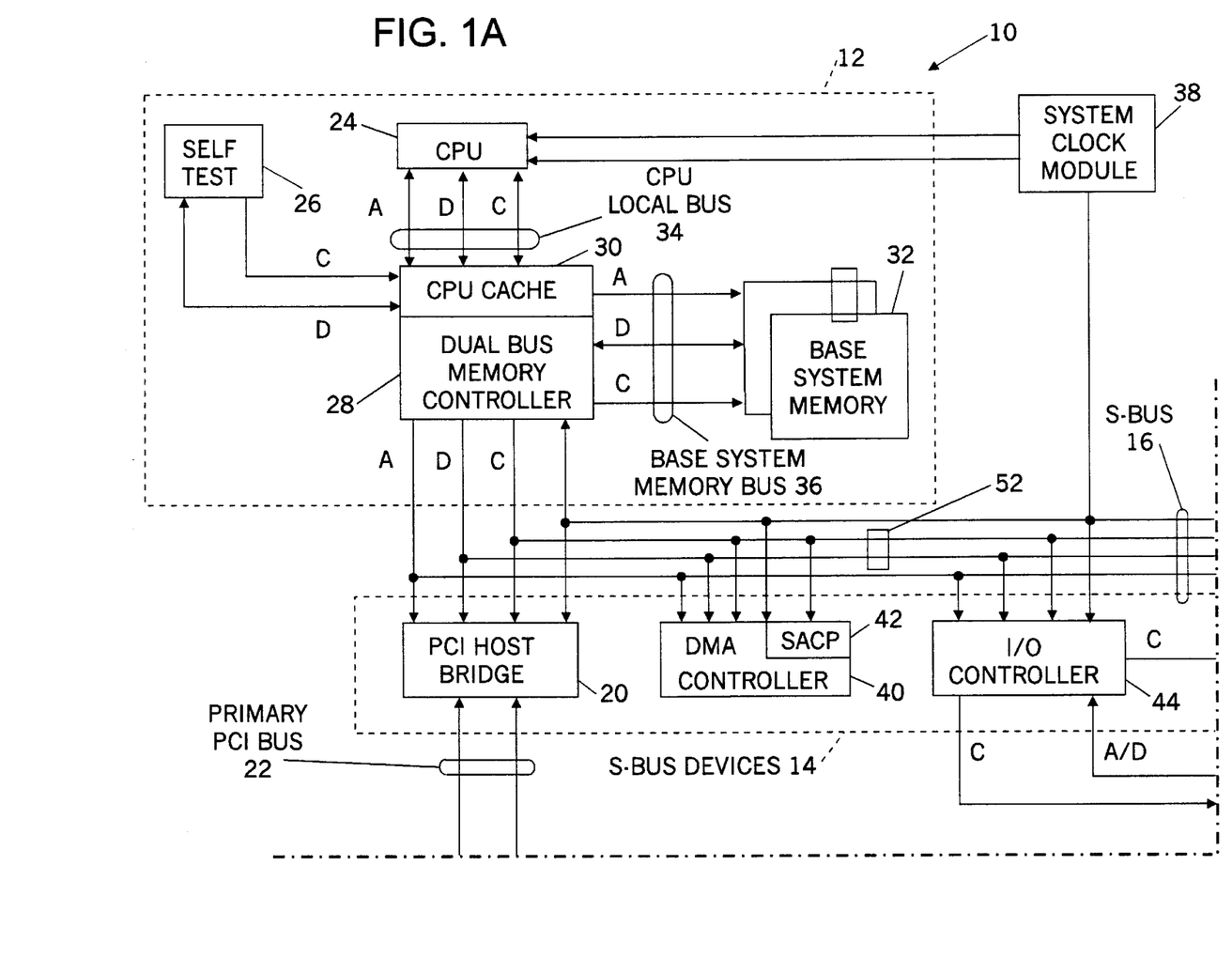
Figure 1B:
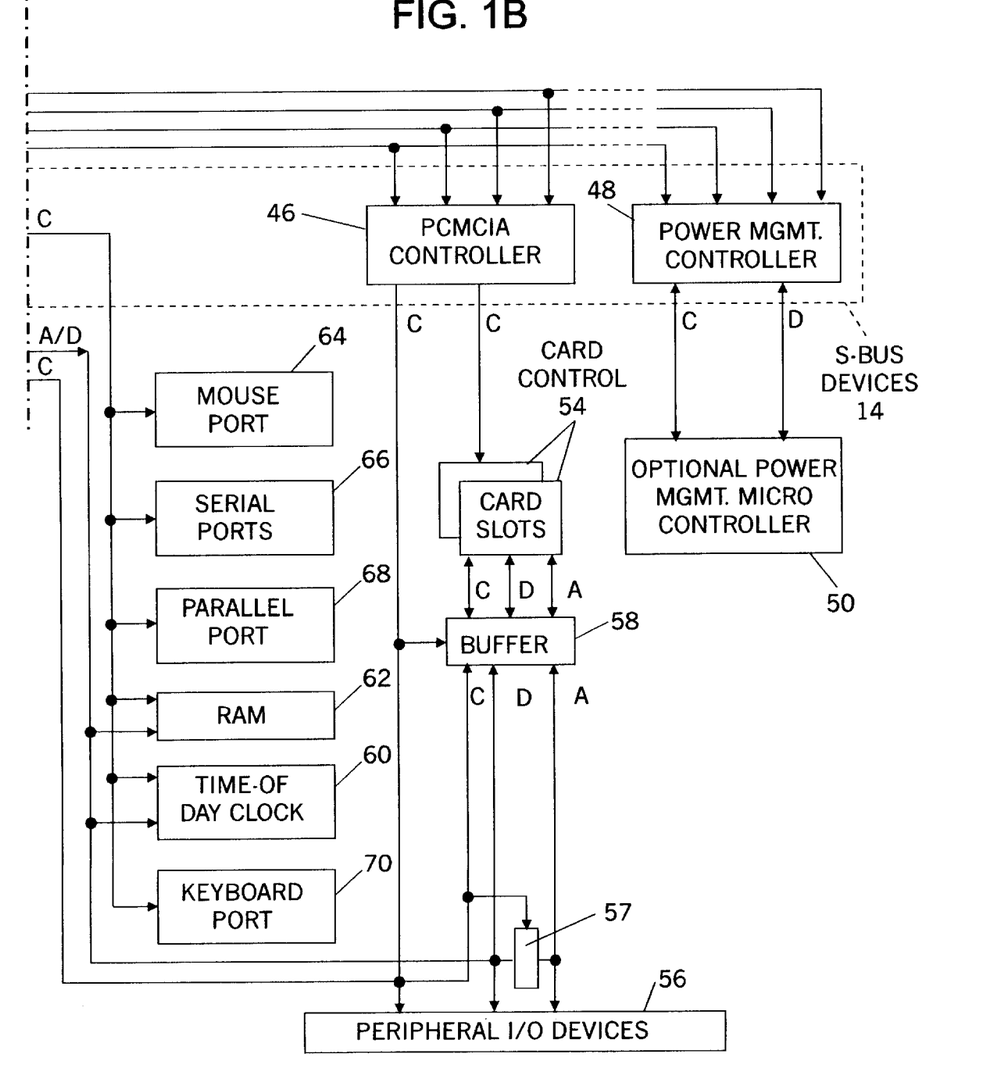

Referring now to FIGS. 1A–1C, a multi-bus information handling system 10 is shown generally at 10, comprising, (I) a processor, cache and memory complex 12 connected to S-bus (system bus) devices 14 via an S-bus 16 and (ii) primary PCI devices 18 attached to one of the S-bus devices, a primary PCI host bridge 20, via a primary PCI bus 22. More detailed descriptions of the processor, cache and memory complex 12, the S-bus devices 14, the primary PCI devices 18, and the other elements shown in FIG. 1 will be provided hereinafter.

The processor, cache and memory complex 12 comprises a central processing unit (CPU) 24, a self-test circuit 26, a memory controller 23, a CPU cache 30, and base system memory 32. The CPU 24 in the preferred embodiment is a 32-bit microprocessor available from Intel, Inc. under the trade designation 1486TM, although it is contemplated that the system 10 may be implemented using other types of CPUS, especially other x86-type microprocessors. The self-test circuit 26 provides a built-in self test (BIST) feature for the CPU 24 upon power-up. The self-test circuit also controls any self-test features which may be incorporated within each of the S-bus devices 14.

The CPU 24 is connected to the self-test circuit 26 and the memory controller 28 by a CPU local bus 34. The memory controller 28 is connected to the base system memory 32 by means of a base system memory bus 36. The memory controller 28 controls read and write operations to base system memory 32 over the base system memory bus 36, which operations are initiated by either the CPU 24 over the CPU local bus 34, or by an S-bus device 14 over the S-bus 16. Because the memory controller has the capability to manage operations on two buses, operations over the base system memory bus 36 and the CPU local bus 34 may be managed simultaneously. The CPU local bus 34, the base system memory bus 36, and the S-bus are 32-bit buses, each of which buses comprises data, address and control information paths ("D", "A", and 'C" in FIG. 1) as is typical of such buses.

Base system memory 32 provides system-wide storage capability and may comprise either non-interleaved or interleaved memory cards. The CPU cache 30 permits short term storage of information contained within either base system memory 32 or expansion memory located elsewhere within the system 10. Such expansion memory could, for example, be located on the peripherally attached I/O devices within the system. The CPU cache 30 incorporates random access memory (RAM, not shown) which is used to temporarily store address locations of the base system memory 32 which are frequently accessed by the CPU 24. The CPU 24 accesses information stored in the CPU cache 30 directly, whereas access to information stored in the base system memory 32 must be handled by the memory controller 28.

All access to base system memory 32 is controlled by the memory controller 28 via base system memory bus 36. The memory controller initiates system memory cycles to the base system memory 32, during which cycles either the CPU 24 or one of the S-bus devices 14 has access to the base system memory via the memory controller 28. During a memory cycle, the memory controller does not pass information onto the S-bus. However, if the memory controller determines that the operation it is managing is an I/O cycle, the memory controller propagates the information onto the S-bus for access thereto by an S-bus device. If the I/O cycle is destined for a S-bus device, the appropriate S-bus device responds with a decode command to the memory controller. If the I/O operation is destined for a primary PCI device 18, the PCI host bridge 20 responds with a decode command to the memory controller and passes the I/O cycle to the appropriate primary PCI device.

A system clock module 38 provides a single clock signal for the S- bus devices 14, and a pair of clock signals for the CPU 24. In the preferred embodiment, the clock signal provided to the S-bus operates at 33 MHZ. The two signals provided to the CPU 24 operate at 33 MHZ and 66 MHZ, respectively. The CPU 24 requires two clock signals because it operates internally at 66 MHZ, but communicates over the CPU local bus 34 at 33 MHZ.

Communications between the processor, cache and memory complex 12 and the S-bus devices are managed by the memory controller 28 over the 32-bit S-bus 16. Also attached to the S-bus, as shown in the preferred embodiment of FIG. 1, are a direct memory access (DMA) controller 40, a system arbitration control point (SACP) 42, an input/output (I/O) controller 44, a PCMCIA controller 46, and a power management controller 48. An optional power management controller 50 may be attached to the power management controller 48 in case more sophisticated power management control is desired. A buffer 52 is provided on the S-bus 16 intermediate the DMA controller 40 and the I/O controller 44. As shown in FIG. 1, however, it is contemplated that other S-bus devices 14, beyond those shown, may be attached to the S-bus 16.

The PCMCIA controller 46 is attached directly to PCMCIA card slots 54. Peripheral I/O devices 56 may be connected to the PCMCIA card slots 54 by means of buffers 58. The peripheral I/O devices 56 are controlled by the I/O controller 44. Attached to the I/O controller are a time-of-day clock 60 and a RAM module 62. The I/O controller 44 supports a variety of ports, including a mouse port 64, serial ports 66, a parallel port 68, and a keyboard port 70.

In addition to supporting S-bus devices 14 on the S-bus 16, the system 10 also supports a second, high speed, high bandwidth bus which, in the preferred embodiment, is the primary PCI bus 22. Primary PCI devices 18 in the system 10 communicate with each other over the primary PCI bus 22. Primary PCI devices communicate with the CPU, cache and memory complex 12 and with other S-bus devices 14 residing on the S-bus 16 by means of the PCI host bridge 20, which is an S-bus device residing on the S-bus. The PCI host bridge 20 serves as an interface between the S-bus 16 and the primary PCI bus 22 and provides an effective means of communication between these two buses, and any peripheral devices which may be attached to these buses.

The PCI host bridge 20 is a low latency interconnect mechanism through which the CPU 24 or other S-bus device 14 may directly access the primary PCI devices 18 or devices attached thereto. The bridge 20 also provides a high performance path that allows the primary PCI devices or devices attached thereto quick and direct access to base system memory 32. In addition, the host bridge 20 provides all of the hardware required to provide an interface between the S-bus 16 and the primary PCI bus 22 so that data may be transferred between these buses. A description of a host bridge implementation suitable for the invention is provided in EP 0629 956 A2 previously cited.

An alternate configuration of information handling system 10 eliminates S-bus 16 so that host bridge 20 connects Primary PCI bus 22 directly to the CPU Local bus 34. In this configuration any of the S-bus devices 14 could be connected to CPU Local bus 34. Since S-bus 16 and CPU Local bus 34 operate using the same architectures, the translation functions performed by the invention, as described below, are the same in this alternate configuration as in the preferred embodiment.

The primary PCI bus 22 is capable of supporting a variety of devices which are PCI compatible. As shown in FIG. 1C, these devices may include a graphics controller 72, a serial SCSI (small computer systems interface) controller 74, a future PCMCIA controller 76, a standard I/O bus (e.g., ISA or Micro Channel) bridge 78 (also referred to herein as an expansion bridge), and a PCI secondary bridge 80. The devices shown in FIG. 1C attached to the primary PCI bus; however, this is only one example of a system implementing a PCI bus architecture and this exemplary configuration is not intended to limit the invention in any way.

The graphics controller 72 is typically provided with memory capability in the form of VRAM 82, which enables the graphics controller to buffer video frames therein, and may control any known graphics package which may be supported by PCI bus architecture. The SCSI controller 74 serves as an interface between SCSI devices 84 attached to a SCSI bus 86 and the primary PCI bus 22, and may control any SCSI device which may be supported by PCI bus architecture. The future PCMCIA controller 76 is attached to and controls card slots 88.

The standard bus bridge 78 serves as an interface between I/O devices 90 attached to a standard (e.g., Micro Channel or ISA) bus 92 and the primary PCI bus 22. Secondary PCI devices 94 are connected to PCI secondary bridge 80 via secondary PCI bus 96. Any number of unidentified secondary PCI devices 94 may then be connected to the secondary PCI bus 96. The PCI secondary bridge 80 serves as an interface between the secondary PCI devices 94 attached to the secondary PCI bus 96, and the primary PCI bus 22.

Data is communicated between PCI devices which reside on PCI buses in the system over those PCI buses (e.g. primary PCI bus 22 and secondary PCI bus 96). Data transactions include read or write operations initiated by a PCI device acting as a master on the bus to or from a PCI device acting as a slave (target) on the bus.

Figure 2:
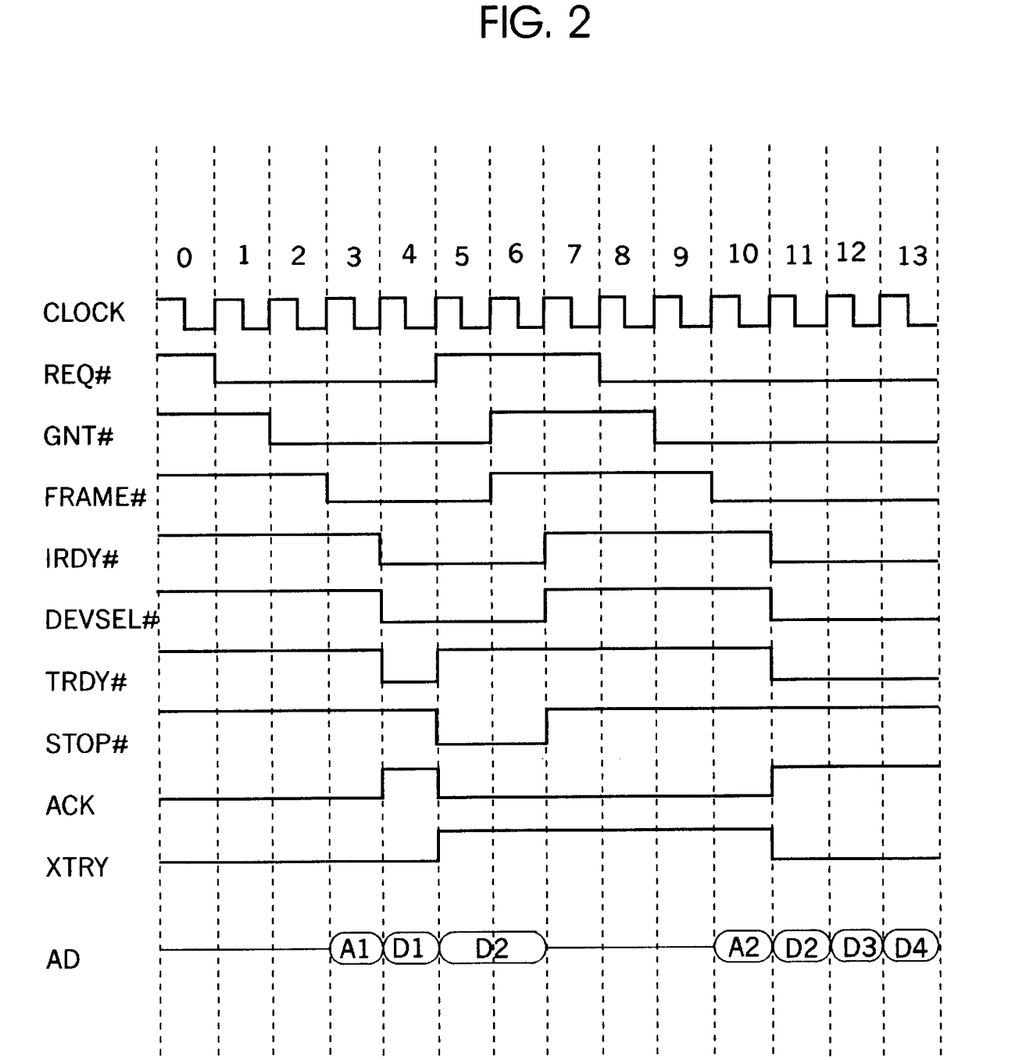
FIG. 2 is a timing diagram showing a retry operation of the invention.

FIG. 2 is a timing diagram of various signals that occur over the PCI bus 22 during a burst transfer toward a peripheral device attached to primary PCI bus 22. Unlike PCI bus architecture, the data and address information of CPU local bus 34 are transmitted on separate lines. Thus, once the slave to which a data transfer is targeted responds to the address transmitted on the address line, the data transfer can be completed in one bus cycle on the CPU local bus. During a burst transfer of several 32-bit strings of data to consecutive addresses, once the slave responds for the first transfer, each of the subsequent data transfers can be completed in a single bus cycle.

The peripheral device could be graphics controller 72, standard bus bridge 78 or any other peripheral device that can be driven from a PCI bus. Similarly, the burst transfer shown in FIG. 2 is typical PCI burst transfer, but is not unique to primary PCI bus 22. It could be burst transfer on secondary PCI bus 96, or any other PCI bus in the PCI network.

The following signal definitions are those of the required pins of any PCI interface. Others signals used for the invention are generated from the standard ones, with logic circuitry well-known for those skilled in the art.

The clock signal (CLOCK) provides the timing for all communications on the PCI network. CLOCK is an input to every PCI device and all PCI bridges. CLOCK is synchronous, meaning that all communication signals in PCI architecture have a duration of at least one clock and any commands or data transfers are executed over the period of at least one clock. The signals in FIG. 2 are separated into individual "cycles" or "periods" by the vertical dashed lines. Each dashed line represents the beginning of one clock cycle and the end of the immediately preceding clock duration. The signals on each line are sampled or have their effective meaning on the rising edge of the clock signal.

The request signal (REQ) is asserted low by any master to use the PCI bus. REQ indicates to the arbiter that this device desires use of the bus. PCI uses a central arbitration scheme to grant the bus to the requester, by a negative grant signal (GNT).

The frame signal (FRAME) is used by any PCI bridge or peripheral device connected to the PCI bus to indicate that it is initiating a communication cycle, or an access, to another PCI bridge or peripheral device connected to the bus. FRAME is a negative active signal. Thus, when a master drives the FRAME low as shown in clock cycle No.3, a master is indicating to a slave that it is initiating an access.

The initiator ready signal (IRDY) is also negative active and indicates when the master is ready for a data transfer to begin. Thus, the master drives IRDY low when it is ready to accept data during a read cycle or to transfer data to the slave during a write cycle.

The target ready signal (TRDY) is activated low and indicates when a slave is ready for a data transfer to begin. Thus, the slave drives TRDY low when it is ready to accept data from the master during a write cycle or to transfer data to the master during a read cycle.

The device select signal (DEVSEL) indicates when active low that the driving device has decoded its address as the target of the current access.

The address/data signal (AD) carries both the address of a register to which a data transfer is targeted and the data that is to be transferred multiplexed on one line. The address information is driven on AD by the master during an address phase when it asserts FRAME. Depending upon whether the access is a write cycle or a read cycle, during a data phase, the master or slave, respectively, will provide the data that is then driven on AD after the address phase. The address phase has the duration of one clock, and the data phase is at least one clock but can be more than one clock if the data transfer is delayed by the assertion of IRDY by the PCI master or TRDY by the slave as shown in clocks cycles No.5 and 6.

The command/byte enable signal (C/BE, not shown) provides PCI bus commands and byte enable signals multiplexed on one line. A bus command is asserted by the master when it asserts FRAME and during the address phase on AD. The bus command can either be a read or a write command depending upon which type of access the master is initiating. The byte enable signals are present on C/BE during the data transfer on AD.

The stop signal (STOP) when asserted low, indicates that the current target is requesting the Master to stop the current transaction.

The function of the various PCI bus signals occurring during an error recovery burst transfer is as follow with reference to FIG. 2.

During the first clock, a master requests the use of the PCI bus through the REQ signal. The grant signal GNT is asserted on the next cycle (clock cycle No. 2) to grant access to the bus. GNT is supposed to be asserted on the next clock cycle, but any other time delay (also called latency timing) is applicable to the invention.

During the third clock cycle, the master drives FRAME low, which means it is initiating an access to a slave. IRDY and TRDY are in a turn around cycle.

At this time, the master provides the address A1 of the register in the slave to which the access is targeted, on the AD line. Simultaneously, a read or write command is generated by the master on the C/BE line (not shown).

Moving on to the fourth clock cycle, the master now has gained control of the IRDY line and drives it low, indicating the master is ready to transfer data to the slave. The slave has also gained control of the TRDY line and the DEVSEL line driving them low, indicating that the slave has decoded the address information as an address of a register within itself and is ready to accept data in that register. Thus, on the fourth clock cycle, the first data D1 is transferred on the AD line from the master into the slave in its decoded register.

In response to the D1 transfer, an acknowledge signal ACK is generated to indicate data transfer is completed. ACK is asserted after each completed data transfer. When either IRDY or TRDY is deasserted, the ACK signal is not generated meaning that an error has occurred during the current transaction. This is explained in detail in the next clock cycle.

During the fifth clock cycle, D2 is transferred on the AD line to the slave at the respective address A2 that sequentially follows the address provided in -the address phase. TRDY is deasserted meaning that the slave is not ready to accept the current data D2, and the ACK signal is not generated. Further to TRDY deassert, the stop signal (STOP) is asserted indicating that the current slave is requesting the master to stop the current transaction and not to transfer any more data. A termination mechanism is initiated by the slave and monitored by logic circuit implemented in the PCI host bridge. A transfer-try-again signal (XTRY) is generated during the fifth clock to retry the transfer of the failed data D2, at the corresponding address A2. REQ is also deasserted during the fifth clock.

On the sixth cycle, FRAME and GNT are deasserted, while D2 is still present on the AD line.

On the following seventh clock cycle, the bus is in an IDLE state during which the address A2 is processed inside the host bridge in order to be transferred on the AD line. The IRDY and DEVSEL signals are deactivated high just as the STOP signal. On the eighth cycle the timing signals are in the configuration such to begin a new access to the peripheral device. A request is send by the same master to gain access to the bus, and REQ is asserted low. Any other master request is refused. The GNT signal is received during the next cycle (clock cycle No. 9).

The following tenth clock cycle repeats the third clock cycle address phase sequence with the address A2 instead of the first address A1. FRAME is asserted while A2 is provided on the AD line.

Finally on the eleventh clock cycle, IRDY, TRDY and DEVSEL are asserted as in the fourth clock. The target is ready to receive data D2. When the ACK signal is generated, it deactivates the XTRY signal, and the burst transfer goes on with data D2.

During the twelfth clock, the next data D3 is transferred on the AD line to the slave at the corresponding address which is implicitly incremented in the host bridge after each successful data transfer when the ACK is generated.

Figure 3:
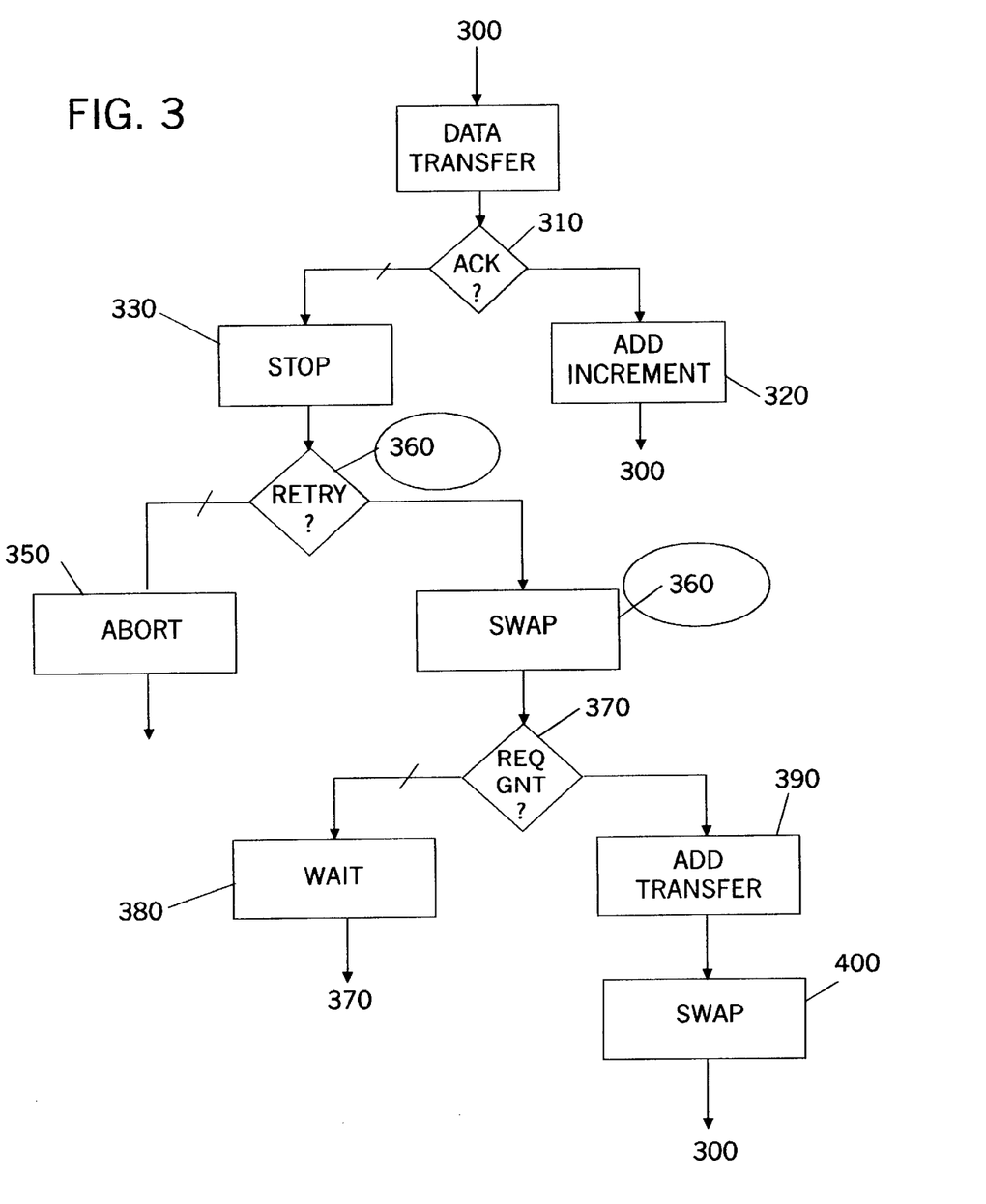
FIG. 3 is a flow chart of a retry operation of the invention.

FIG. 3 is the flow chart of the retry function already discussed in the comments of FIG. 2. In step (300) the current data arriving on the AD line is transferred to the slave. A test of successful transfer is performed on step (310). If the data is acknowledged (branch YES) the following operation (320) is to increment the address stored in the host bridge, and to transfer the ensuing data on the AD line (step 300). If the data is not acknowledged (branch NO), this means a target termination is initiated (330). A new test is performed on step (340) to state if the stop operation must be followed by a retry data transfer or not. The result of the test depends on the state of the TRDY, DEVSEL and STOP signals. If the answer to (340) is NO, then a target-abort termination occurs on (350) and the PCI bus is free for others devices. If a retry is detected (branch YES), the retry procedure is initiated into the host bridge.

Figure 4:
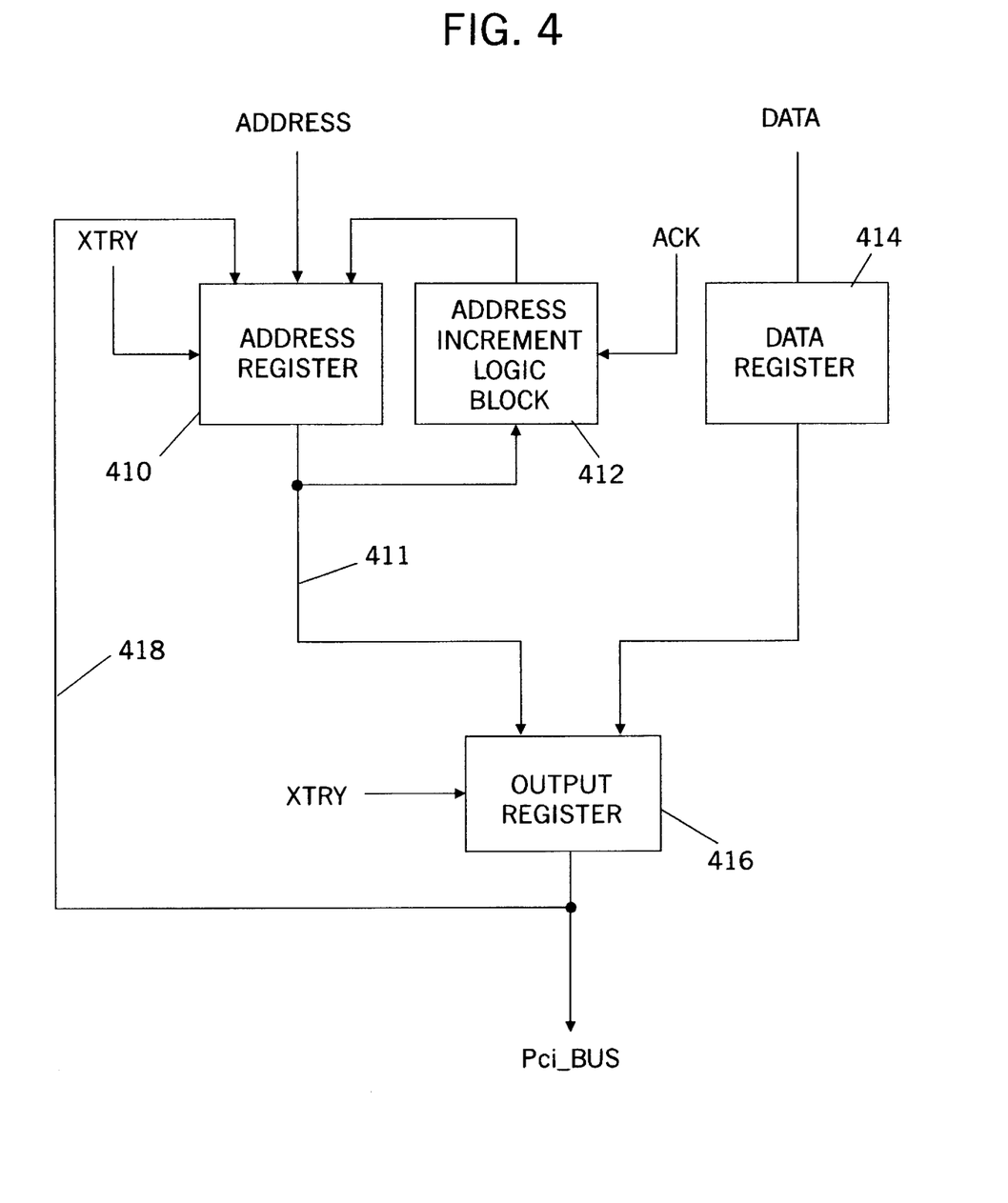
FIG. 4 is a block diagram of a host bridge circuit that includes an exemplary implementation of the invention wherein the contents of an address register and an output register can be swapped in response to a retry operation.

Referring now to FIG. 4, which shows a simplified block diagram of the circuits (410, 412, 414, 416) of the host bridge involved in a burst transfer, the control signals (ACK, XTRY) driving the retry mechanism, and the connection line (18) for processing the failed data and its respective address.

With reference to FIG. 4, the step (360) operates as follow: The content of the address register (410) and the content of the output register (416) are swapped. The XTRY signal allows the content of the address register (410) to flow on the connection line (411) to the output register (416), while allowing the content of the output register to flow on the connection line (418) to the address register. Therefore, the content of the output register becomes the address of the untransferred data. This address has been incremented on step (320) through the address increment circuit (412) which is controlled by the ACK signal. The content of the address register becomes the untransferred data.

On next step (370), a new request-grant operation is performed to access the PCI bus. The new transfer is not processed until GRANT is not asserted (380). When the GRANT signal is asserted, the transaction begins (390), and the address of the failed data is send to the slave. Then on step (400), another swap is performed between the content of both the address register (10) and the output register (16). The content of the address register becomes the last transferred address (A2 of FIG. 2), while the output register (16) is filled with the failed data (D2 of FIG. 2). Next step is (300).

In another embodiment, the method is useful when the slave device is not able to receive burst transaction, wherein a first address is transferred followed by multiple data transfers. The slave acknowledges the first data transfer, but does not accept a second one. In that case, the ACK signal is not generated whereas a STOP signal is generated meaning that the slave is not ready to receive another data. The STOP is processed as a retry indication, and the double swapping (360 to 400 on FIG. 3) between the second address and the untransferred data is generated. Then the second transaction comprises the second address followed by the second data. Next, the third data belonging to the burst data string is transferred but the slave does not acknowledge a successful transfer and once again a retry operation is performed with the third address followed by the third data. The process goes on with unacknowledged data transfers replaced by successful address plus data transfers, until the last data of the burst data string is transferred. Therefore the retry and recovery procedure offers a way to convert a burst mode to a single mode transaction without any additional hardware resources.

I claim:

1. A data processing system, comprising:

a first bus;

a bus master device coupled to said first bus;

a second bus having time multiplexed address/data lines;

a peripheral device coupled to said second bus;

a bridge circuit coupling said first bus to said second bus, said bridge circuit including:

a) an address register for storing addresses received from said first bus;

b) incrementing means, coupled to said address register, for incrementing an address stored in said address register; and c) an output register for outputting addresses and data to said multiplexed address/data lines of said second bus;

means for burst mode transfers of a block of data elements between said bus master and said peripheral device, including means for aborting a burst mode transfer of a block of data elements subsequent to the successful transfer of a last data element, but prior to the unsuccessful transfer of a next data element;

swapping means for swapping the information stored in said address register with the information stored in said output register; and first means for activating said swapping means in response to a request to retry a previously aborted burst mode transfer of a block of data elements, such that said output register contains the address of said next data element and said address register contains said next data element.

2. The data processing system of claim 1, further comprising:

second means for activating said swapping means subsequent to the placement of said address of said next data element on said multiplexed address/data lines, such that said output register contains said next data element and said address register contains said address of said next data element; and means for activating said incrementing means, such that said address register contains the address of the data element that follows said next data element.

* * * * *